US008218848B2

United States Patent
Lenglet et al.

(10) Patent No.: US 8,218,848 B2
(45) Date of Patent: Jul. 10, 2012

(54) SYSTEM AND METHOD FOR THE GENERATION OF ATTENUATION CORRECTION MAPS FROM MR IMAGES

(75) Inventors: Christophe Lenglet, Minneapolis, MN (US); Christophe Chefd'hotel, Jersey City, NJ (US); Bernhard Geiger, Cranbury, NJ (US); Tina Ehtiati, Baltimore, MD (US); Jens Gühring, Monmouth Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 555 days.

(21) Appl. No.: 12/506,333

(22) Filed: Jul. 21, 2009

(65) Prior Publication Data

US 2010/0021034 A1    Jan. 28, 2010

Related U.S. Application Data

(60) Provisional application No. 61/082,895, filed on Jul. 23, 2008.

(51) Int. Cl.
   *G06K 9/00*       (2006.01)
(52) U.S. Cl. ...................................... 382/131
(58) Field of Classification Search .......... None
   See application file for complete search history.

(56) References Cited

U.S. PATENT DOCUMENTS

| | | | | |
|---|---|---|---|---|
| 7,787,675 B2* | 8/2010 | Pan et al. | | 382/128 |
| 7,840,051 B2* | 11/2010 | Razeto | | 382/131 |
| 7,860,283 B2* | 12/2010 | Begelman et al. | | 382/128 |
| 7,965,880 B2* | 6/2011 | Yoshida et al. | | 382/128 |
| 2003/0004405 A1* | 1/2003 | Townsend et al. | | 600/407 |
| 2003/0147548 A1* | 8/2003 | Ruhl et al. | | 382/100 |
| 2004/0030246 A1* | 2/2004 | Townsend et al. | | 600/427 |
| 2007/0090300 A1* | 4/2007 | Sibomana et al. | | 250/370.09 |
| 2008/0135769 A1* | 6/2008 | Rosen | | 250/363.09 |
| 2010/0086185 A1* | 4/2010 | Weiss | | 382/131 |
| 2010/0204563 A1* | 8/2010 | Stodilka et al. | | 600/411 |
| 2010/0303319 A1* | 12/2010 | Wang | | 382/131 |
| 2011/0007958 A1* | 1/2011 | Salomon et al. | | 382/131 |
| 2011/0028825 A1* | 2/2011 | Douglas et al. | | 600/407 |
| 2011/0123083 A1* | 5/2011 | Ojha et al. | | 382/131 |
| 2011/0164801 A1* | 7/2011 | Gagnon et al. | | 382/131 |

\* cited by examiner

*Primary Examiner* — Jason M Repko
*Assistant Examiner* — Thomas A James
(74) *Attorney, Agent, or Firm* — Donald B. Paschburg; F. Chau & Associates, LLC

(57) ABSTRACT

A method for generating a positron emission tomography (PET) attenuation correction map from magnetic resonance (MR) images includes segmenting a 3-dimensional (3D) magnetic resonance (MR) whole-body image of a patient into low-signal regions, fat regions, and soft tissue regions; classifying the low-signal regions as either lungs, bones, or air by identifying lungs, identifying an abdominal station, and identifying a lower body station; and generating an attenuation map from the segmentation result by replacing the segmentation labels with corresponding representative attenuation coefficients.

20 Claims, 6 Drawing Sheets

SYSTEM AND METHOD FOR THE GENERATION OF ATTENUATION CORRECTION MAPS FROM MR IMAGES

CROSS REFERENCE TO RELATED UNITED STATES APPLICATIONS

This application claims priority from "A Segmentation Method for the Generation of Attenuation Correction Maps from MR Images", U.S. Provisional Application No. 61/082,895 of Lenglet, et al., filed Jul. 23, 2008, the contents of which are herein incorporated by reference in their entirety.

TECHNICAL FIELD

This disclosure is directed to the reconstruction of positron emission tomography (PET) data from magnetic resonance (MR) imaging data.

DISCUSSION OF THE RELATED ART

Positron emission tomography (PET) is an imaging technique which produces a three-dimensional image or picture of functional processes in the body. The imaging system detects pairs of gamma rays emitted indirectly by a positron-emitting radionuclide (tracer), which is introduced into the body on a biologically active molecule. Images of tracer concentration in 3-dimensional space within the body are then reconstructed by computer analysis. In modern scanners, this reconstruction is often accomplished with the aid of a CT X-ray scan performed on the patient during the same session, in the same machine.

To conduct the scan, a short-lived radioactive tracer isotope is injected into a subject, usually via blood. The tracer is chemically incorporated into a biologically active molecule. There is a waiting period while the active molecule becomes concentrated in tissues of interest, after which the subject is placed in the imaging scanner.

As the radioisotope undergoes positron emission decay, it emits a positron. After traveling a short distance the positron encounters and annihilates with an electron, producing a pair of 511 keV gamma ray photons moving in opposite directions. These are detected when they reach a scintillator in the scanning device. The technique depends on simultaneous or coincident detection of the pair of photons moving in approximately opposite directions. As the most significant fraction of electron-positron decays result in two gamma photons being emitted at almost 180 degrees to each other, it is possible to localize their source along a straight line of coincidence, referred to as the line of response (LOR). In practice, the LOR has a finite width as the emitted photons are not exactly 180 degrees apart.

Using statistics collected from tens-of-thousands of coincidence events, a set of equations for the total activity of each parcel of tissue along the LORs can be solved by a number of techniques, to construct and plot a map of radioactivities as a function of image voxel location. The resulting map shows the tissues in which the molecular probe has become concentrated, and can be interpreted by a radiologist in the context of the patient's diagnosis and treatment plan.

Coincidence events can be grouped into projections images, called sinograms. The sinograms are sorted by the angle of each view and tilt. The sinogram images are analogous to the projections captured by computed tomography (CT) scanners, and can be reconstructed in a similar way. However, the statistics of the data are worse than those obtained through transmission tomography. A normal PET data set has millions of counts for an entire acquisition, while a CT scan can reach a few billion counts. As such, PET data suffer from scatter and random events more dramatically than does CT data.

In practice, pre-processing of PET data is required, such as correction for random coincidences, estimation and subtraction of scattered photons, detector dead-time correction, and detector-sensitivity correction.

As different LORs must traverse different thicknesses of tissue, the photons are attenuated differentially. The result is that structures deep in the body may be reconstructed as having falsely low tracer uptake. Contemporary scanners can estimate attenuation using integrated x-ray CT or MR equipment. While attenuation corrected images are generally more faithful representations, the correction process is itself susceptible to significant artifacts. As a result, both corrected and uncorrected images are always reconstructed and read together.

SUMMARY OF THE INVENTION

Exemplary embodiments of the invention as described herein generally include methods and systems for identifying four or five major tissue types of the human body, namely air, fat, soft tissues, bones and lungs, from MR data. Delineating different compartments of the human body exhibiting different photon attenuation coefficients is a critical step in PET emission data reconstruction. The input to a method according to an embodiment of the invention is either a single dedicated MR scan or a pair of images composed of the MR scan and an additional Dixon fat image. The latter provides information on the amount of fat present in each tissue, and can be used to extract the fatty tissue. Such scans will typically be acquired in multiple overlapping stations (thoracic area, abdomen, pelvis, etc.), and composed into a single volume. The output of a method according to an embodiment of the invention is an attenuation correction map, obtained by assigning known attenuation values to each compartment. In the so-called 4-compartment model, the attenuation coefficient of bony structures is arbitrarily set to that of soft tissue. The resulting attenuation correction map can be subsequently used by a PET image reconstruction algorithm.

According to an aspect of the invention, there is provided a method for generating a positron emission tomography (PET) attenuation correction map from magnetic resonance (MR) images, the method including segmenting a 3-dimensional (3D) magnetic resonance (MR) whole-body image of a patient into low-signal regions, fat regions, and soft tissue regions; classifying the low-signal regions as either lungs, bones, or air by identifying lungs, identifying an abdominal station, and identifying a lower body station; and generating an attenuation map from the segmentation result by replacing the segmentation labels with corresponding representative attenuation coefficients, where identifying an abdominal station comprises identifying an only large low-intensity connected component crossed by a line connecting a trachea with a crotch as a bladder; sorting all low intensity connected components along the posterior-anterior direction according to the position of their center-of-mass in the anterior-posterior direction; selecting a point along the anterior/posterior axis; and labeling a low-intensity component beyond the selected point as bone, and labeling a component before the selected point as air.

According to a further aspect of the invention, the method includes pre-processing the MR image to reduce MR imaging artifacts in the image.

According to a further aspect of the invention, segmenting the image into low-signal regions, fat regions, and soft tissue regions comprises an intensity-based segmentation using histogram-based thresholding.

According to a further aspect of the invention, the method includes thresholding a Dixon fat image to obtain a labeling of fat regions in the body.

According to a further aspect of the invention, identifying the lungs comprises removing all connections to outside air by detecting the onset of the shoulders in the image and discarding that part of the image above the shoulders, labeling all connected low-signal components, identifying all connected components that reach a border of the image as outside air, sorting the remaining connected components by volume, identifying a largest structure in the image as lungs and airways, identifying a region from the shoulders to an underside of the lungs as thorax, and identifying the remaining low-signal connected components as either bone or cerebrospinal fluid.

According to a further aspect of the invention, the method includes computing a bounding box about the sorted connected components, where if a bounding box of a largest structure in the image contains only one lung, adding a second largest component to the largest component.

According to a further aspect of the invention, identifying the lungs comprises removing all connections to outside air by detecting the onset of the shoulders in the image and discarding that part of the image above the shoulders, selecting from the image below the shoulders a slab containing a plurality of contiguous 2-dimensional axial slices, labeling all low-signal connected components in the slab, detecting a centermost component in the slab that matches a pre-determined set of rules, growing a region in the 3D image starting from the centermost component, and identifying the region as lungs if the region satisfies heuristics for lungs, and identifying a region from the shoulders to an underside of the lungs as thorax.

According to a further aspect of the invention, if the grown region does not satisfy heuristics for lungs, selecting another slab of contiguous 2D axial slices further down from the shoulders, and repeating the steps of labeling all low-signal connected components in the slab, detecting a centermost component in the slab, and growing a region in the 3D image starting from the centermost component, and determining whether the grown region satisfies lung heuristics.

According to a further aspect of the invention, identifying a lower body station comprises applying a sphere detector on a Dixon fat image to detect a head of a left femur and a head of a right femur, starting with a plane defined by centers of the two spheres and a normal vector pointing in a feet-head direction, moving the plane towards the feet, identifying a new fat region as crotch area, where every region below a triangle defined by the left femur, the right femur, and the crotch is labeled as fat, soft tissue, or low intensity regions, and labeling the low intensity regions as soft tissue.

According to another aspect of the invention, there is provided a method for generating a positron emission tomography (PET) attenuation correction map from magnetic resonance (MR) images, the method including segmenting a 3-dimensional (3D) magnetic resonance (MR) whole-body image of a patient into low-signal regions, fat regions, and soft tissue regions, classifying the low-signal regions as either lungs, bones, or air by identifying lungs, identifying an abdominal station, and identifying a lower body station, and generating an attenuation map from the segmentation result by replacing the segmentation labels with corresponding representative attenuation coefficients, where identifying a lower body station comprises applying a sphere detector on a Dixon fat image to detect a head of a left femur and a head of a right femur; starting with a plane defined by centers of the two spheres and a normal vector pointing in a feet-head direction, moving the plane towards the feet; identifying a new fat region as crotch area, where every region below a triangle defined by the left femur, the right femur, and the crotch is labeled as fat, soft tissue, or low intensity regions; and labeling the low intensity regions as soft tissue.

According to a further aspect of the invention, identifying an abdominal station comprises identifying an only large low-intensity connected component crossed by a line connecting a trachea with a crotch as a bladder, sorting all low intensity connected components along the posterior-anterior direction according to the position of their center-of-mass in the anterior-posterior direction, selecting a point along the anterior/posterior axis, and labeling a low-intensity component beyond the selected point as bone, and labeling a component before the selected point as air.

According to another aspect of the invention, there is provided a program storage device readable by a computer, tangibly embodying a program of instructions executable by the computer to perform the method steps for generating a positron emission tomography (PET) attenuation correction map from magnetic resonance (MR) images.

DETAILED DESCRIPTION OF EXEMPLAR EMBODIMENTS

Figure 1:
FIG. 1 depicts an example of input magnetic resonance image of a human torso, according to an embodiment of the invention.

Exemplary embodiments of the invention as described herein generally include systems and methods for generating an attenuation correction map from an MR image. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from nonmedical contexts, such as, for example remote sensing systems, electron microscopy, etc. Although an image can be thought of as a function from $R^3$ to R, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Figure 3:
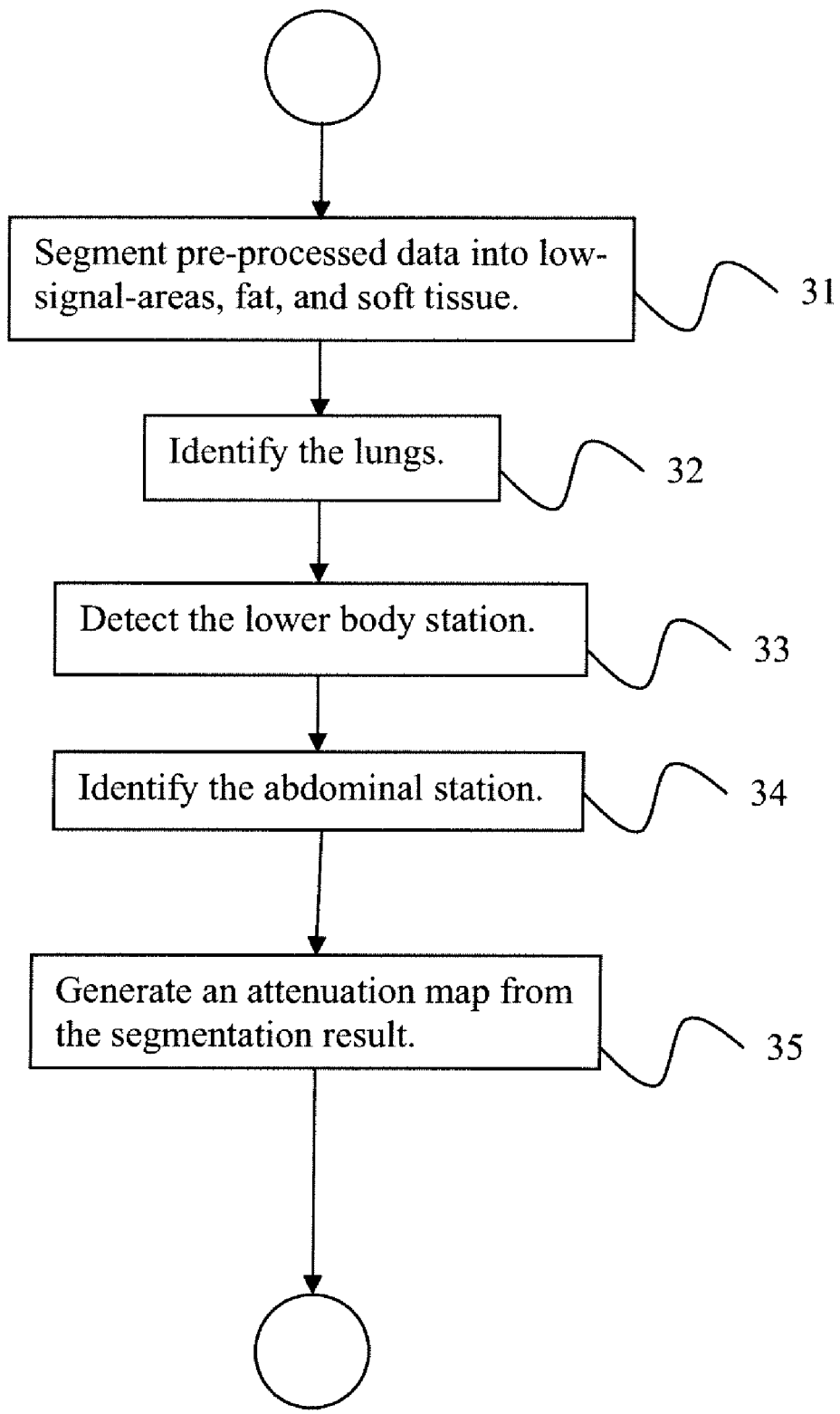
FIG. 3 is a flowchart of a segmentation method for generating an attenuation correction map from an MR image, according to an embodiment of the invention.

FIG. 3 is a flowchart of a segmentation method for generating an attenuation correction map from an MR image, according to an embodiment of the invention. Prior to performing a generating an attenuation correction map from an MR image, various types of MR imaging artifacts can be reduced by pre-processing the images, to improve the robustness of the subsequent segmentation steps. The pre-processing may include linear or nonlinear spatial filtering to reduce noise, as well as bias field correction via homomorphic filtering.

Referring now to FIG. 3, an intensity based segmentation begins at step 31 by segmenting the pre-processed MR data into 3 compartments: low signal areas (air, lungs and bones), fat and soft tissues. To achieve this first labeling, an embodiment of the invention uses a histogram-based thresholding technique. Several different approaches are possible, such as a multi-threshold extension of the Otsu method, or computing these thresholds from a Gaussian-Mixture model estimated using the Expectation-Maximization algorithm, by, e.g., computing one threshold per pair of neighboring Gaussian kernels, where the threshold is taken as the position where their graphs intersect. Other methods as are known in the art could also be used. This step can also exploit the information from the Dixon image, by thresholding the Dixon fat image to directly obtain a labeling of fat regions in the body, to improve the quality of fat segmentation.

Figure 2:
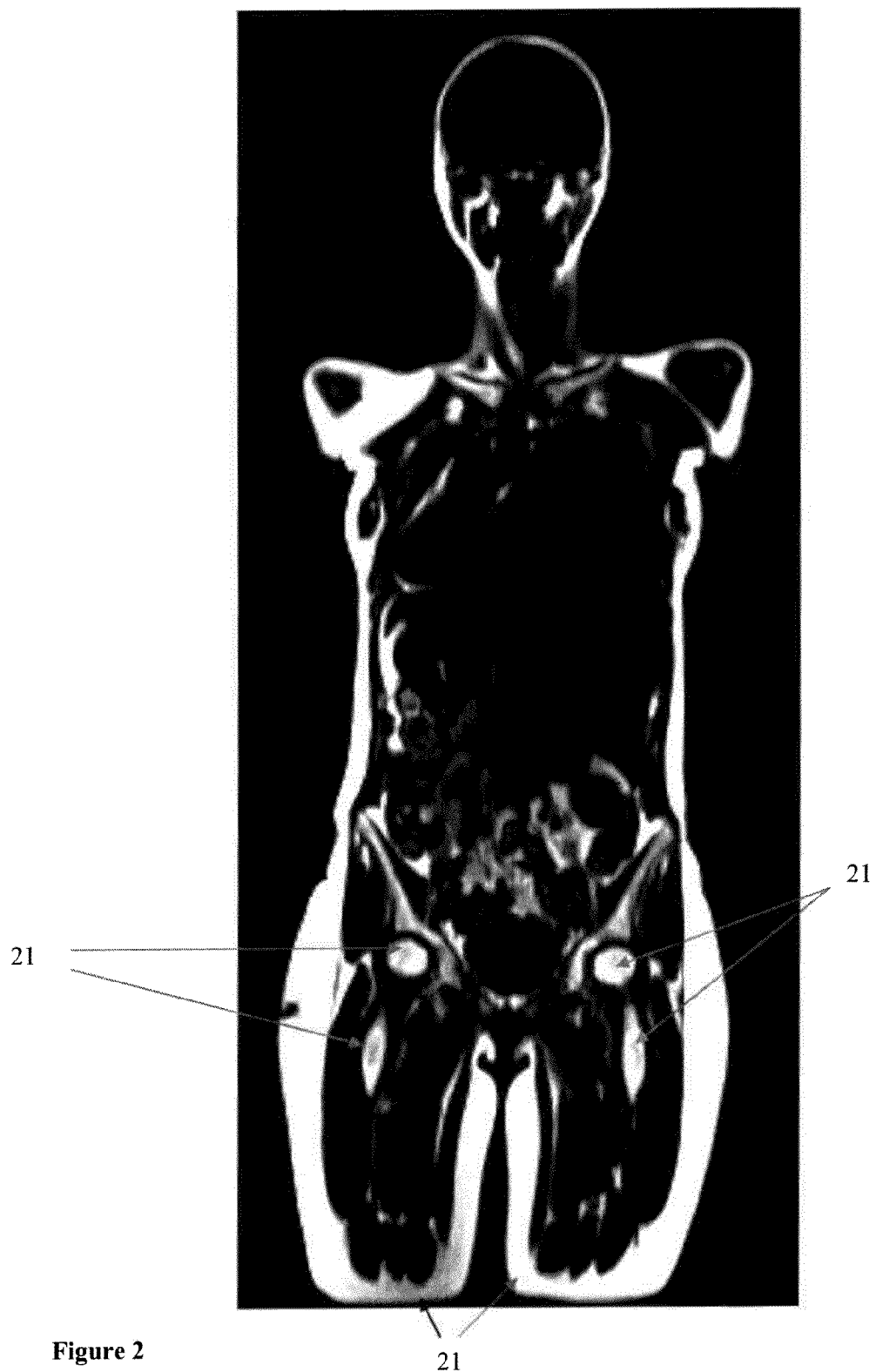
FIG. 2 depicts an example of a Dixon fat image of a human torso, according to an embodiment of the invention.

A Dixon image is an image acquired using the Dixon technique, an imaging technique for creating MRI images of water only and fat only (see Dixon W. T., "Simple proton spectroscopic imaging", Radiology 1984, 153:189-194), herein incorporated by reference in its entirety. The technique as disclosed by Dixon is based on periodic variations in the free induction decay signal (FID) in acquiring an image, and is referred to as a two-point method. By applying different echo times one can acquire a "sum of fat and water" image and a "difference of fat and water" image, from which one may determine a fat image and a water image. The reconstructed images in the two-point method may suffer from errors due to inhomogeneities in the intensity of the magnetic field. This issue may be addressed by acquiring three images in what is known as the 3-point Dixon method. Single-point Dixon methods are also known. These Dixon methods are capable of computing pure fat and pure water images from MR raw data making use of the defined difference in precession times between bound water protons and bound fat protons. FIG. 1 depicts an example of input magnetic resonance image of a human torso, and FIG. 2 depicts an example of a Dixon fat image of a human torso, with the fat regrions being the bright areas 21.

For an image divided into M intensity level classes with M−1 thresholds $\{t_1, t_2, \ldots, t_{M-1}\}$ and a maximum intensity L, Otsu's method for determining those thresholds involves finding optimal thresholds $\{t_1^*, t_2^*, \ldots, t_{M-1}^*\}$ that maximize a between-class variance of the thresholded image:

$$\{t_1^*, t_2^*, \ldots, t_{M-1}^*\} = \underset{1 \leq t_1 < \ldots t_{M-1} < L}{\mathrm{ArgMax}} \{\sigma_B^2(t_1, t_2, \ldots, t_{M-1})\},$$

where the between-class variance is $\sigma_B^2 = \Sigma_{k=1}^T \omega_k (\mu_k - \mu_T)^2$, with $\omega_k = \Sigma_{i \in C_k} p_i$, and $$\mu_k = \frac{1}{\varpi_k} \sum_{i \in C_k} i p_i,$$

where $p_i$ is the probability of gray level i in the image and $C_k$ is intensity level class k.

Returning to FIG. 3, one is left with the task of classifying the low signal areas: lungs, bones and air (background+abdominal air pockets). This may be accomplished using a series of heuristics. The lungs are identified at step 32, the lower body station is detected at step 33, and the abdominal station is identified at step 34. These steps are described in detail below.

Attenuation maps are generated from the segmentation result at step 35 by replacing the segmentation labels (air, lungs, fat, soft tissue) with the corresponding representative attenuation coefficients, called μ-values. The representative μ-value for a particular tissue type is arbitrary and is a parameter of the method, and is typically estimated from Computed Tomography (CT) scans by deriving an average attenuation coefficient from density measurements.

Regarding step 32 of FIG. 3, under normal conditions, not artificially inflated like the colon, for example, the lungs are the largest air filled space inside the body. The lungs are connected via bronchi and trachea/throat and nasal space to the outside air. According to an embodiment of the invention, the lungs may be identified according to the following steps, illustrated in the flowchart of FIG. 4.

Figure 4:
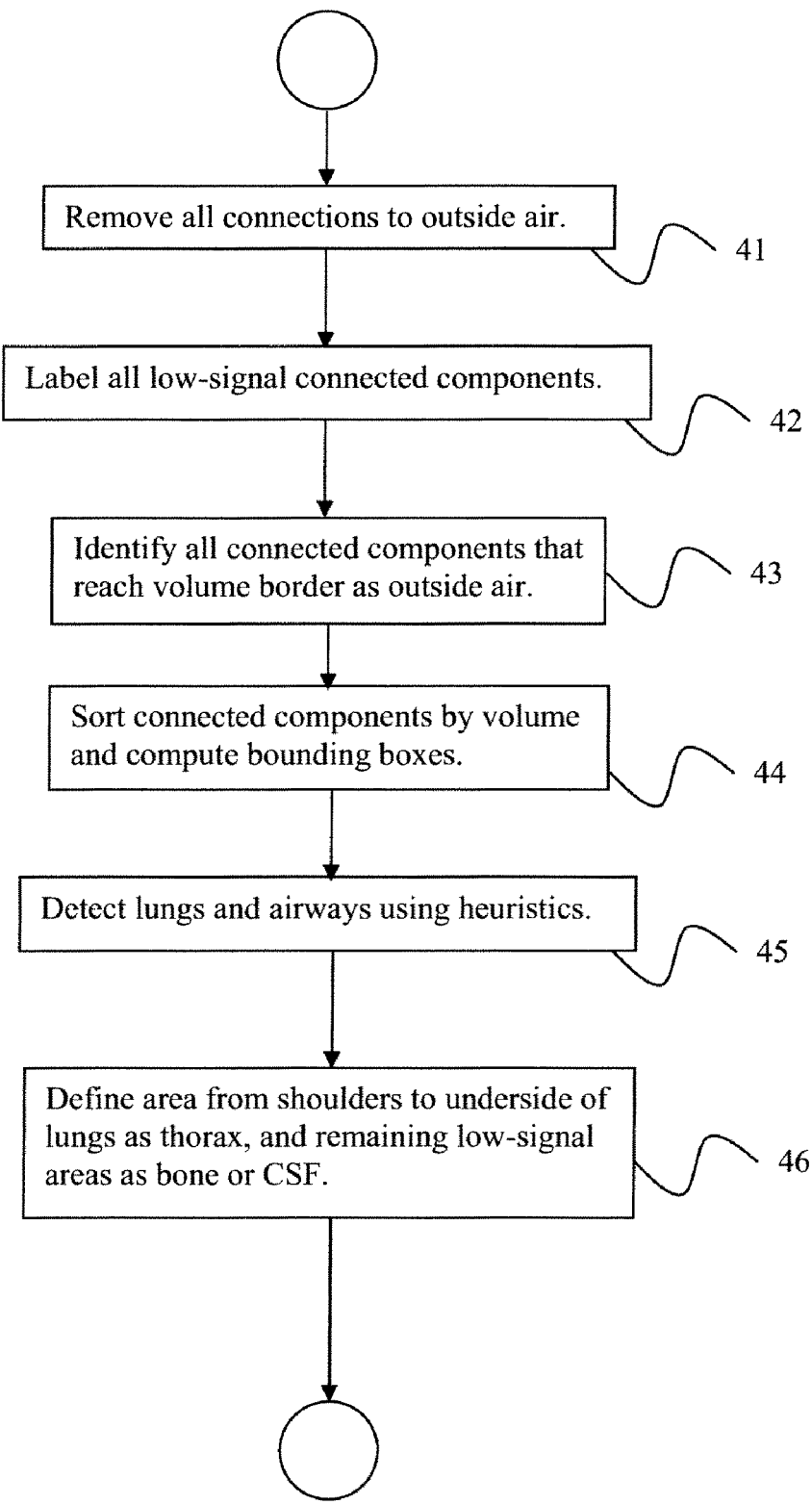
FIG. 4 is a flowchart of a method for identifying the lungs in an MR image, according to an embodiment of the invention

Referring now to FIG. 4, a method for identifying the lungs begins at step 41 by removing any connection to the outside air. This can be accomplished using axial images by detecting the onset of the shoulders moving from the head down and discarding the upper images, that is, that part of the image above the shoulders. To detect the shoulders, one starts from the head, and proceeding towards the feet, one looks for the largest increase of body voxels from one axial plane to the next in the upper half of the body. Then, at step 42, all "low signal" connected components are labeled, using, for example, region growing or single pass labeling. Next, at step 43, all connected components that reach the border of the volume are identified as outside air. At this stage, only the internal structures, such as lungs, airways, esophagus, colon, small intestine, bones and potentially, fluids, remain to be identified. The remaining connected components are sorted at step 44 according to volume, and bounding boxes about the components are computed. At step 45, according to an embodiment of the invention, simple heuristics are used to detect the lungs and airways. For example, the largest structure in the image should be the lungs and airways. If the bounding box of the largest structure covers only one lung, i.e. is missing the connection between both lungs, the second largest component can be added to the largest component. The area from the shoulders to the underside of the lungs is defined at step 46 as the thorax, and the remaining "low signal" connected components within this area are likely to be bones or the cerebrospinal fluid (CSF) surrounding the spinal cord, and are identified thusly.

Figure 5:
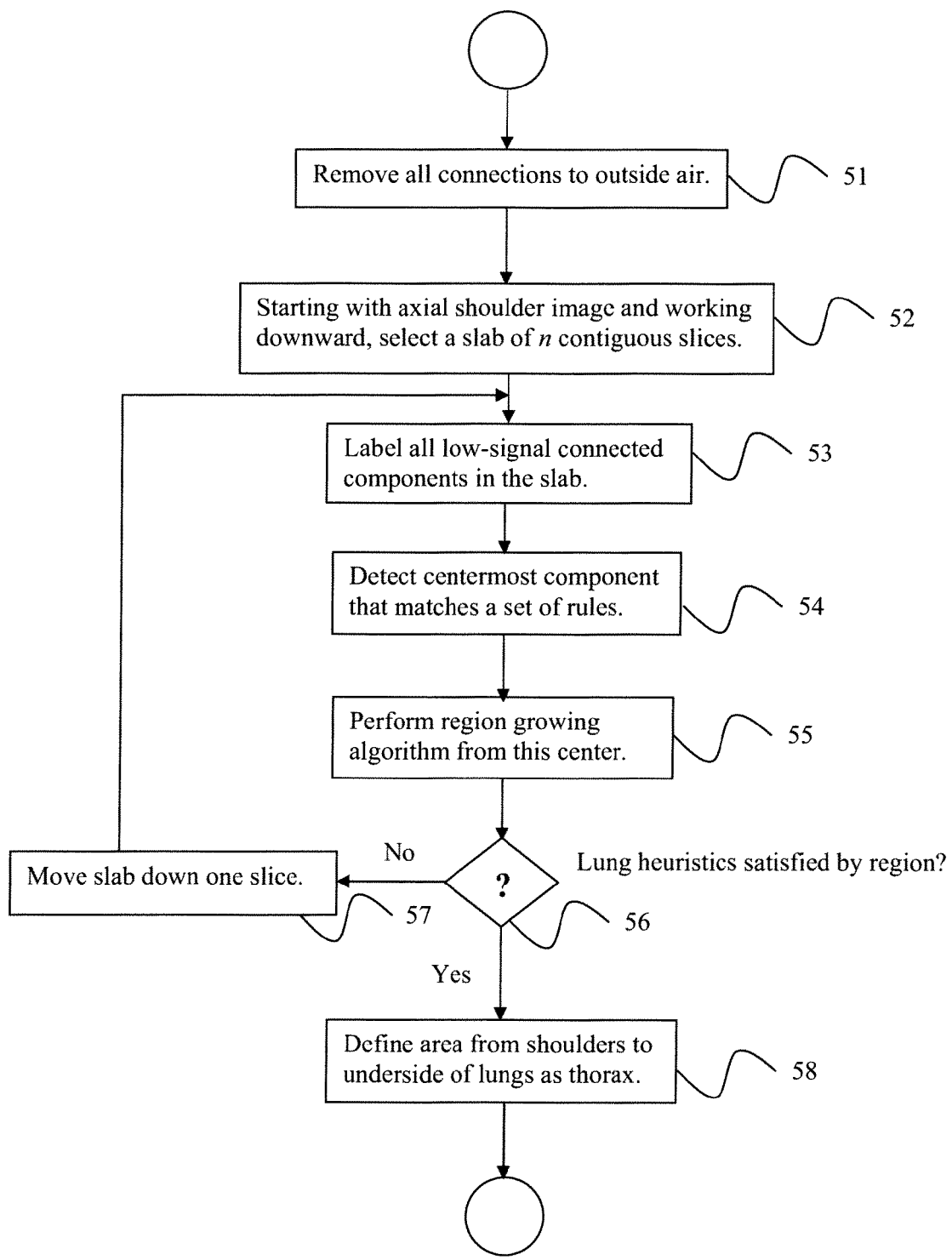
FIG. 5 is a flowchart of another method for identifying the lungs in an MR image, according to an embodiment of the invention

FIG. 5 is a flowchart of an alternative method for lung segmentation, according to an embodiment of the invention. The method of FIG. 5 is faster that the method of FIG. 4, but does not handle the case when the lungs are not inter-connected via the trachea. Referring now to the figure, a method begins at step 51 by removing any connection to the outside air, similar to step 41 of FIG. 4. Next, at step 52, starting with axial shoulder images and working downward, a slab of n contiguous 2D image slices is selected. An exemplary, non-limiting value of n is n=3. At step 53, all "low-signal" connected components in the slab are labeled. The centermost component that matches a set of rules, such as the volume in the range of that of the human trachea, is detected at step 54. At step 55, from this center, a region growing algorithm is started in the full 3D data set. This region growing should grow into both lungs. If, at step 56, the heuristics for full lungs are not met, for example, by the volume being too small for human lungs, in which case one must be in the esophagus, the slab is moved down one slice at step 57, and the method returns to step 53 and repeats steps 53 to 56. Upon completion, at step 58, the area from shoulders to the underside of the lungs is defined as the thorax.

Referring back to FIG. 3, after the lungs have been identified, the next step 33 is identifying the lower body station. According to an embodiment of the invention, the lower part of this station is detected by applying a sphere detector, such as the Hough transform, on the Dixon fat, the bright portions of FIG. 2. This allows finding the head of the left and right femurs. Next, starting with a plane defined by the centers of those two spheres and a normal vector pointing in the feet-head direction, that plane is progressively moved towards the patient's feet. Initially, only 1 fat connected region is crossed by the plane. When a new fat region appears, one has reached the crotch area. This defines a triangle (left femur, right femur, and crotch). Everything below this triangle must already be labeled as fat, soft tissues, or low intensity regions. Since there is no air in such parts of the human body, low intensity regions are labeled as soft tissues.

Finally, at step 34, the abdominal station is identified. This is a challenging region to handle as it contains low intensity structures such as the bladder, sparse air pockets, small bones and possibly, cerebrospinal fluid (CSF) surrounding the spinal cord. The bladder is detected as the only large connected component with low intensity and crossed by a line going through the trachea and crotch. Finally, all low intensity connected components along the posterior-anterior direction are sorted and clustered. The low intensity connected components of the abdominal region are sorted according to the position of their center-of-mass in the anterior-posterior direction. It is known that bony structures such as the vertebrae are located in the posterior region while gas pockets (in the colon and small intestine) are more likely to be found in the anterior region. A position may be arbitrarily defined along the anterior/posterior axis, and any component beyond that point is labeled as bone instead of air. Additional heuristics, such as the shape of the connected component, such as its roundness, volume, etc., can be used to help with classification.

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 6:
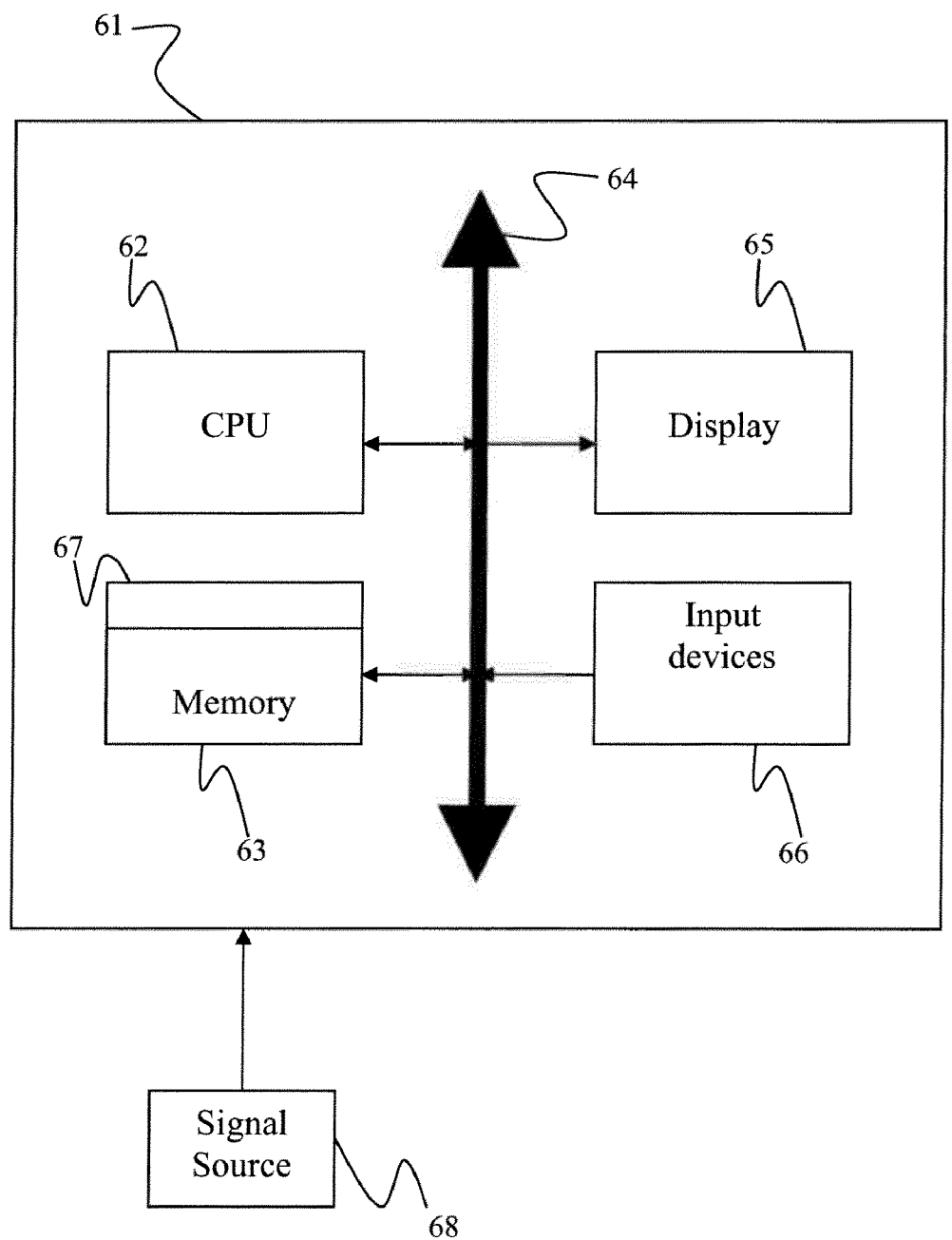
FIG. 6 is a block diagram of an exemplary computer system for implementing a segmentation method for generating an attenuation correction map from an MR image, according to an embodiment of the invention.

FIG. 6 is a block diagram of an exemplary computer system for implementing a segmentation method for generating a PET attenuation correction map from an MR image according to an embodiment of the invention. Referring now to FIG. 6, a computer system 61 for implementing the present invention can comprise, inter alia, a central processing unit (CPU) 62, a memory 63 and an input/output (I/O) interface 64. The computer system 61 is generally coupled through the I/O interface 64 to a display 65 and various input devices 66 such as a mouse and a keyboard. The support circuits can include circuits such as cache, power supplies, clock circuits, and a communication bus. The memory 63 can include random access memory (RAM), read only memory (ROM), disk drive, tape drive, etc., or a combinations thereof. The present invention can be implemented as a routine 67 that is stored in memory 63 and executed by the CPU 62 to process the signal from the signal source 68. As such, the computer system 61 is a general purpose computer system that becomes a specific purpose computer system when executing the routine 67 of the present invention.

The computer system 61 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A computer-implemented method for generating a positron emission tomography (PET) attenuation correction map from magnetic resonance (MR) images, said method performed by the computer comprising the steps of:

segmenting a 3-dimensional (3D) magnetic resonance (MR) whole-body image of a patient into low-signal regions, fat regions, and soft tissue regions;

classifying the low-signal regions as either lungs, bones, or air by identifying lungs, identifying an abdominal station, and identifying a lower body station; and generating an attenuation map from the segmentation result by replacing the segmentation labels with corresponding representative attenuation coefficients, wherein identifying an abdominal station comprises identifying an only large low-intensity connected component crossed by a line connecting a trachea with a crotch as a bladder; sorting all low intensity connected components along the posterior-anterior direction according to the position of their center-of-mass in the anterior-posterior direction; selecting a point along the anterior/posterior axis; and labeling a low-intensity component beyond the selected point as bone, and labeling a component before the selected point as air.

2. The method of claim 1, further comprising pre-processing said MR image to reduce MR imaging artifacts in said image.

3. The method of claim 1, wherein segmenting said image into low-signal regions, fat regions, and soft tissue regions comprises an intensity-based segmentation using histogram-based thresholding.

4. The method of claim 3, further comprising thresholding a Dixon fat image to obtain a labeling of fat regions in said body.

5. The method of claim 1, wherein identifying the lungs comprises:
removing all connections to outside air by detecting the onset of the shoulders in the image and discarding that part of the image above the shoulders;
labeling all connected low-signal components;
identifying all connected components that reach a border of the image as outside air;
sorting the remaining connected components by volume;
identifying a largest structure in the image as lungs and airways;
identifying a region from the shoulders to an underside of the lungs as thorax; and
identifying the remaining low-signal connected components as either bone or cerebrospinal fluid.

6. The method of claim 5, further comprising computing a bounding box about the sorted connected components, wherein if a bounding box of a largest structure in the image contains only one lung, adding a second largest component to the largest component.

7. The method of claim 1, wherein identifying the lungs comprises:
removing all connections to outside air by detecting the onset of the shoulders in the image and discarding that part of the image above the shoulders;
selecting from said image below the shoulders a slab containing a plurality of contiguous 2-dimensional axial slices;
labeling all low-signal connected components in the slab;
detecting a centermost component in the slab that matches a pre-determined set of rules;
growing a region in the 3D image starting from said centermost component, and identifying said region as lungs if said region satisfies heuristics for lungs; and
identifying a region from the shoulders to an underside of the lungs as thorax.

8. The method of claim 7, wherein if said grown region does not satisfy heuristics for lungs, selecting another slab of contiguous 2D axial slices further down from the shoulders, and repeating said steps of labeling all low-signal connected components in the slab, detecting a centermost component in the slab, and growing a region in the 3D image starting from said centermost component, and determining whether said grown region satisfies lung heuristics.

9. The method of claim 1, wherein identifying a lower body station comprises:
applying a sphere detector on a Dixon fat image to detect a head of a left femur and a head of a right femur;
starting with a plane defined by centers of the two spheres and a normal vector pointing in a feet-head direction, moving said plane towards the feet;
identifying a new fat region as crotch area, wherein every region below a triangle defined by the left femur, the right femur, and the crotch is labeled as fat, soft tissue, or low intensity regions; and
labeling said low intensity regions as soft tissue.

10. A computer-implemented method for generating a positron emission tomography (PET) attenuation correction map from magnetic resonance (MR) images, said method performed by the computer comprising the steps of:
segmenting a 3-dimensional (3D) magnetic resonance (MR) whole-body image of a patient into low-signal regions, fat regions, and soft tissue regions;
classifying the low-signal regions as either lungs, bones, or air by identifying lungs, identifying an abdominal station, and identifying a lower body station; and
generating an attenuation map from the segmentation result by replacing the segmentation labels with corresponding representative attenuation coefficients,
wherein identifying a lower body station comprises applying a sphere detector on a Dixon fat image to detect a head of a left femur and a head of a right femur; starting with a plane defined by centers of the two spheres and a normal vector pointing in a feet-head direction, moving said plane towards the feet; identifying a new fat region as crotch area, wherein every region below a triangle defined by the left femur, the right femur, and the crotch is labeled as fat, soft tissue, or low intensity regions; and labeling said low intensity regions as soft tissue.

11. The method of claim 10, wherein identifying an abdominal station comprises:
identifying an only large low-intensity connected component crossed by a line connecting a trachea with a crotch as a bladder;
sorting all low intensity connected components along the posterior-anterior direction according to the position of their center-of-mass in the anterior-posterior direction;
selecting a point along the anterior/posterior axis; and
labeling a low-intensity component beyond the selected point as bone, and labeling a component before the selected point as air.

12. A program storage device readable by a computer, tangibly embodying a program of instructions executable by the computer to perform the method steps for generating a positron emission tomography (PET) attenuation correction map from magnetic resonance (MR) images, said method performed by the computer comprising the steps of:
segmenting a 3-dimensional (3D) magnetic resonance (MR) whole-body image of a patient into low-signal regions, fat regions, and soft tissue regions;
classifying the low-signal regions as either lungs, bones, or air by identifying lungs, identifying an abdominal station, and identifying a lower body station; and
generating an attenuation map from the segmentation result by replacing the segmentation labels with corresponding representative attenuation coefficients,
wherein identifying an abdominal station comprises identifying an only large low-intensity connected component crossed by a line connecting a trachea with a crotch as a bladder; sorting all low intensity connected components along the posterior-anterior direction according to the position of their center-of-mass in the anterior-posterior direction; selecting a point along the anterior/posterior axis; and labeling a low-intensity component beyond the selected point as bone, and labeling a component before the selected point as air.

13. The computer readable program storage device of claim 12, the method further comprising pre-processing said MR image to reduce MR imaging artifacts in said image.

14. The computer readable program storage device of claim 12, wherein segmenting said image into low-signal regions, fat regions, and soft tissue regions comprises an intensity-based segmentation using histogram-based thresholding.

15. The computer readable program storage device of claim 14, the method further comprising thresholding a Dixon fat image to obtain a labeling of fat regions in said body.

16. The computer readable program storage device of claim 12, wherein identifying the lungs comprises:
    removing all connections to outside air by detecting the onset of the shoulders in the image and discarding that part of the image above the shoulders;
    labeling all connected low-signal components;
    identifying all connected components that reach a border of the image as outside air;
    sorting the remaining connected components by volume;
    identifying a largest structure in the image as lungs and airways;
    identifying a region from the shoulders to an underside of the lungs as thorax; and
    identifying the remaining low-signal connected components as either bone or cerebrospinal fluid.

17. The computer readable program storage device of claim 16, the method further comprising computing a bounding box about the sorted connected components, wherein if a bounding box of a largest structure in the image contains only one lung, adding a second largest component to the largest component.

18. The computer readable program storage device of claim 12, wherein identifying the lungs comprises:
    removing all connections to outside air by detecting the onset of the shoulders in the image and discarding that part of the image above the shoulders;
    selecting from said image below the shoulders a slab containing a plurality of contiguous 2-dimensional axial slices;
    labeling all low-signal connected components in the slab;
    detecting a centermost component in the slab that matches a pre-determined set of rules;
    growing a region in the 3D image starting from said centermost component, and identifying said region as lungs if said region satisfies heuristics for lungs; and
    identifying a region from the shoulders to an underside of the lungs as thorax.

19. The computer readable program storage device of claim 18, wherein if said grown region does not satisfy heuristics for lungs, selecting another slab of contiguous 2D axial slices further down from the shoulders, and repeating said steps of labeling all low-signal connected components in the slab, detecting a centermost component in the slab, and growing a region in the 3D image starting from said centermost component, and determining whether said grown region satisfies lung heuristics.

20. The computer readable program storage device of claim 12, wherein identifying a lower body station comprises:
    applying a sphere detector on a Dixon fat image to detect a head of a left femur and a head of a right femur;
    starting with a plane defined by centers of the two spheres and a normal vector pointing in a feet-head direction, moving said plane towards the feet;
    identifying a new fat region as crotch area, wherein every region below a triangle defined by the left femur, the right femur, and the crotch is labeled as fat, soft tissue, or low intensity regions; and
    labeling said low intensity regions as soft tissue.

* * * * *